(12) United States Patent
Nakai

(10) Patent No.: US 6,600,813 B1
(45) Date of Patent: *Jul. 29, 2003

(54) PERSONAL COMMUNICATION SYSTEM WITH AUTOMATIC FUNCTIONS

(75) Inventor: Hideki Nakai, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,568

(22) Filed: Mar. 18, 1999

(30) Foreign Application Priority Data

Mar. 20, 1998 (JP) .......................... 10-071570

(51) Int. Cl.$^7$ ............................... H04M 1/64
(52) U.S. Cl. .................. 379/68; 379/88.19; 379/88.1
(58) Field of Search .................. 379/70, 77, 88.08, 379/88.09, 88.1, 88.2, 67.1, 88.19, 88.21, 88.01, 68, 88.22

(56) References Cited

U.S. PATENT DOCUMENTS

| 4,860,339 A | * | 8/1989 | D'Agosto, III et al. .. 379/88.11 |
| 5,313,516 A | * | 5/1994 | Afshar et al. ............. 379/88.24 |
| 5,848,130 A | * | 12/1998 | Rochkind ................... 379/67.1 |
| 5,881,104 A | * | 3/1999 | Akahane ..................... 379/88.1 |
| 6,009,082 A | * | 12/1999 | Caswell et al. ............. 370/276 |
| 6,327,343 B1 | * | 12/2001 | Epstein et al. ........... 379/88.01 |

FOREIGN PATENT DOCUMENTS

| JP | 5-176024 | 7/1993 | |
| JP | 05-176024 A | * 7/1993 | ............ H04M/1/00 |

* cited by examiner

*Primary Examiner*—Fan Tsang
*Assistant Examiner*—Ovidio Escalante
(74) *Attorney, Agent, or Firm*—David G. Conlin; William J. Daley, Jr.; Edwards & Angell, LLP (57) ABSTRACT

In a communication apparatus having a recording function and a reproducing answering function, a message can be always recorded and reproduced in an optimum setting with requiring no cumbersome operation by a user. When a telephone number coincident with a telephone number contained in information of a caller which arrives through a communication line and received by an information-receiving unit is judged as being stored in a storage unit, a main control unit of the communication apparatus sets a recording level of a recording and reproducing unit on the basis of a recording level which is stored in the storage unit in relation to the telephone number.

8 Claims, 5 Drawing Sheets

| No. | TELEPHONE NUMBER | RECORDING LEVEL | COMPRESSION RATE OF RECORDING | REPRODUCING SPEED | NEED-OF-RECORDING |
|---|---|---|---|---|---|
| 1 | 0123456789 | 8 | 7 | 5 | 0 |
| 2 | 1234567890 | 3 | 2 | 1 | 1 |
| 3 | 2345678901 | 5 | 5 | 8 | 0 |
| ⋮ | ⋮ | ⋮ | ⋮ | ⋮ | ⋮ |
| 99 | 9012345678 | 5 | 5 | 5 | 0 |

FIG. 2B

| No. | TELEPHONE NUMBER | COMPRESSION RATE OF RECORDING | REPRODUCING VOLUME | REPRODUCING SPEED | NEED-OF-RECORDING |
|---|---|---|---|---|---|
| 1 | 0123456789 | 7 | 8 | 5 | 0 |
| 2 | 1234567890 | 2 | 3 | 1 | 1 |
| 3 | 2345678901 | 5 | 5 | 8 | 0 |
| ⋮ | ⋮ | ⋮ | ⋮ | ⋮ | ⋮ |
| 99 | 9012345678 | 5 | 5 | 5 | 0 |

FIG. 2C

| MESSAGE | No. |
|---|---|
| THIS IS XX. .... | 2 |
| IN THE MATTER OF YYY, .... | 1 |
| THE MEETING STARTS AT Z P.M. OF Z MONTH, ZTH DAY. | 99 |
| ⋮ | ⋮ |
| | |

PERSONAL COMMUNICATION SYSTEM WITH AUTOMATIC FUNCTIONS

BACKGROUND OF THE INVENTION

1. Field of the Invention

The present invention relates to a communication apparatus having recording and reproducing functions.

2. Description of the Related Art

Conventionally, among communication apparatuses including an information terminal having a communication function, a portable telephone, and a facsimile apparatus, some communication apparatuses are provided with recording and reproducing functions in which a message sent from a calling side communication apparatus is recorded via a user's operation, and reproduced with arbitrary timing via a user's operation, and an automatically answering and recording function of automatically seizing a line upon detection of a call signal from the line, sending a previously registered answering message to the calling side communication apparatus by using the recording and reproducing functions, and thereafter recording a message sent from the calling side communication apparatus (hereinafter, often referred to as "calling side apparatus"). Some of communication apparatuses having such recording and reproducing functions and a telephone answering function are further provided with a function of previously setting a message-recording level and a compression rate of recording, and a function of adjusting a reproducing volume and speed during reproduction of a message.

In the prior art communication apparatus, in the case where the voice of a user of a calling side apparatus is low or loud, a user of a communication apparatus of a called side must adjust the message-recording level or message-reproducing volume thereof. This produces a problem that the user of the communication apparatus is required to conduct cumbersome operations. When the user of the calling side apparatus speaks rapidly or slowly, the user of the communication apparatus must adjust the message-reproducing speed, thereby causing a problem that the user of the communication appratus is required to conduct cumbersome operations.

When the level of noise which is superimposed on a message sent from the calling side apparatus is high, the message is inaudible unless the compression rate of recording is set to be low. In contrast, when the compression rate of recording is set to be low, the message-recording capacity is reduced. Consequently, the user must adjust the compression rate of recording for each recording in accordance with the state of the noises. In the prior art communication apparatus, therefore, cumbersome operations must be conducted by the user. In the case where the prior art communication apparatus is configured so that the recording of a message is automatically started in the same manner as the automatic telephone answering function, the compression rate of recording can be adjusted only in the initial setting. Consequently, it is difficult to increase the message-recording capacity while enabling a message from a calling side apparatus to be recorded at an audible level.

Japanese Unexamined Patent Publication JP-A 5-176024 (1993) discloses a technique of automatically adjusting the reception-volume level of a telephone terminal apparatus. In the telephone terminal apparatus disclosed by the publication, the reception-volume level in a call which is to be started in response to reception of a termination signal containing a calling number is determined in accordance with a result of matching of an area code in the calling number with a predetermined area code. As a result, the reception-volume level of the telephone terminal apparatus is adjusted according to the area where the calling side communication apparatus exists. In the telephone terminal apparatus, therefore, the reception-volume level in a call between the telephone terminal apparatus and plural communication apparatuses in a certain same area can be hardly set for each of the communication apparatuses. As a result, when the telephone terminal apparatus is further provided with the recording and reproducing functions, it is difficult to set parameters relating to recording and reproducing of a message, in accordance with habits of the users of the communication apparatuses in the same area. The predetermined area codes must be manually registered into the telephone terminal apparatus by the user. Consequently, the volume of reception in a call between the telephone terminal apparatus and a calling side telephone terminal of an area code which is not registered is not adjusted irrespective of the communication history of the telephone terminal apparatus.

SUMMARY OF THE INVENTION

It is an object of the invention to provide a communication apparatus which can always record and reproduce a message in an optimum state of setting without requiring any cumbersome operation by the user.

In a first invention a communication apparatus provided with a recording and reproducing unit capable of recording a message of a caller which arrives through a line, and as well reproducing the recorded message with arbitrary timing, comprises:

a storage unit for storing one or more telephone numbers;
  a reception unit for receiving information of the caller which arrives through the line at termination of the call; and
  a control unit for, upon termination of the call, determining whether a telephone number coincident with a telephone number contained in information of the caller received by the reception unit is stored in the storage unit or not, and adjusting recording conditions of the recording and reproducing unit on the basis of the determination.

According to the first invention, the communication apparatus operates as described above. As a result, in the communication apparatus, each time when a message from a calling side communication apparatus arrives, conditions of recording the message can be automatically adjusted in accordance with the telephone number in the information of the calling side apparatus which information has been received before the arrival of the message. Therefore, the communication apparatus can adequately record the message from the calling side apparatus in accordance with the calling side apparatus.

In a second invention, the communication apparatus of the first invention is configured so that the storage unit further stores recording conditions to be used when the information of the caller containing the telephone number is received, in relation to the stored telephone number, and when at termination of the call a telephone number coincident with the telephone number contained in the information of the caller received by the reception unit is judged as being stored in the storage unit, the control unit sets recording conditions stored in relation to the telephone number as recording conditions of the recording and reproducing unit.

According to the second invention, the communication apparatus operates as described above. As a result, when a message is to be recorded, the recording conditions are set easily and adequately on the basis of the telephone number in the received information of the caller. Therefore, the communication apparatus can record more adequately the message from the calling side apparatus in accordance with the calling side apparatus.

In a third invention, the communication apparatus further comprises an operation unit for setting a reproducing condition of a message recorded by the recording and reproducing unit, and when a message is recorded by the recording and reproducing unit, the message is associated by the control unit with the telephone number contained in the information of the caller received by the reception unit, and in the case where the reproducing condition is set by the operation unit during reproduction of the message recorded by the recording and reproducing unit, the control unit sets recording conditions on the basis of the set reproducing condition and stores the recording conditions into the storage unit in relation to the telephone number corresponding to the reproduced message.

According to the third invention, the communication apparatus operates as described above. Therefore, the communication apparatus can set a telephone number and recording conditions without requiring no cumbersome operation by the user.

In a fourth invention, the communication apparatus of the first invention is configured so that in the case where at termination of the call the telephone number coincident with the telephone number contained in the information of the caller received by the reception unit is judged as being not stored in the storage unit, the control unit stores the received telephone number into the storage unit.

According to the fourth invention, the control unit of the communication apparatus of the first invention operates as described above. As a result, in the communication apparatus of the fourth invention, a history of telephone numbers which were received by the communication apparatus is automatically prepared and stored into the storage unit. According to this configuration, the communication apparatus can automatically adjust the recording level at termination, of information of the caller containing a telephone number which was received one time, irrespective whether the telephone number has been registered into the communication apparatus by the user. Therefore, cumbersome operations of registering a telephone number by the user can be reduced.

In a fifth invention, the communication apparatus of the first invention is configured so that the recording condition is a recording level of a message.

According to the fifth invention, when information of the caller which arrives through the line is received by the receiving means upon termination of the call, the controlling means determines whether a telephone number coincident with the telephone number contained in the information of the caller is stored in the storage means or not, and adjusts the recording level of recording and reproducing functions on the basis of the determination. Therefore, the communication apparatus can adequately record a message from a calling side apparatus of a low or high volume.

Specifically, in the communication apparatus, the recording level of the recording and reproducing unit can be adjusted on the basis of whether the telephone number coincident with the telephone number contained in the received information of the caller is previously registered or not. For example, a telephone number of a calling side apparatus which is used by a user of a low voice is previously registered, and the apparatus is set so that, in the case where a telephone number contained in information of the caller which arrives through the line at termination of the call coincides with the registered telephone number, the recording level is increased. Alternatively, a telephone number of a calling side apparatus which is used by a user of a loud voice is previously registered, and the apparatus is set so that, in the case where a telephone number contained in information of the caller which arrives through the line at termination of the call coincides with the registered telephone number, the recording level is reduced. According to this configuration, the communication apparatus can record a message sent from the calling side apparatus at an adequate level irrespective of the level of the voice of a user of the calling side apparatus. Furthermore, the user of the communication apparatus is not required to conduct the setting for each recording of a message, and hence the operational burden on the user can be reduced.

Furthermore, the communication apparatus of the fifth invention may be configured so that, when information of the caller which arrives through the line at termination of the call is received by the reception unit, the control unit determines whether the telephone number coincident with the telephone number contained in the information of the caller is registered in the storage unit or not, and in the case where the coincident telephone number is judged as being stored in the storage unit, a recording level which is stored in relation to the telephone number is set as the recording level of the recording and reproducing function. According to this configuration, the communication apparatus can record more adequately a message from a calling side apparatus whose volume is low or high.

In the communication apparatus, the recording level corresponding to the telephone number coincident with the telephone number contained in information of the caller which arrives through the line at termination of the call can be set as the recording level of the recording and reproducing unit. For example, a telephone number of a calling side apparatus which is used by the user of a low voice is previously registered in the communication apparatus in correspondence with a high recording level, or a telephone number of a calling side apparatus which is used by a user of a loud voice is previously registered in correspondence with a low recording level. According to this configuration, the communication apparatus can record more adequately a message sent from a calling side apparatus, irrespective of the level of the voice of the user of the calling side apparatus. Furthermore, the user of the communication apparatus is not required to conduct the setting for each recording of a message, and hence an operational burden on the user can be reduced.

Furthermore, when the recording and reproducing unit of the communication apparatus records a message, the recorded message is associated by the control unit with the telephone number contained in the information of the caller received by the reception unit, and in the case where the reproducing volume is set by the operation unit during reproduction of the recorded message, the control unit sets the recording level on the basis of the set reproducing volume, and stores the recording level into the storage unit in relation to the telephone number corresponding to the reproduced message. According to this configuration, the communication apparatus can set a telephone number and a recording level with requiring no cumbersome operation by the user.

In the communication apparatus, when the reproducing volume is once set to an adequate value during reproduction of a message, the recording level corresponding to the telephone number can be thereafter automatically set to the adequate value. According to this configuration, in the communication apparatus, the recording of a message can be made in a nearly optimum state with requiring almost no cumbersome operation by the user.

In a sixth invention, the communication apparatus of the first invention is configured so that the recording condition is a compression rate of recording of a message.

According to the sixth invention, in the communication apparatus, when information of the caller which arrives through the line at termination of the call is received by the reception unit, the control unit determines whether a telephone number coincident with the telephone number contained in the information of the caller is stored in the storage unit or not, and adjusts the compression rate of recording of the recording and reproducing unit on the basis of the determination. According to this configuration, the communication apparatus can record adequately a message from a calling side apparatus in which the level of noise which is superimposed on a message is high or low.

Specifically, in the communication apparatus, the compression rate of recording of the recording and reproducing unit can be adjusted on the basis of whether a telephone number coincident with the telephone number contained in the information of the caller which arrives through the line at termination of the call is previously registered or not. For example, a telephone number of a calling side apparatus of a high noise level is previously registered in the communication apparatus, and the communication apparatus is set so that, in the case where a telephone number contained in information of the caller which arrives through the line at termination of the call coincides with the registered telephone number, the compression rate of recording is lowered. Alternatively, a telephone number of a calling side apparatus of a low noise level is previously registered, and the communication apparatus is set so that, when a telephone number contained in information of the caller which arrives through the line at termination of call coincides with the registered telephone number, the compression rate of recording is raised. According to this configuration, in the communication apparatus, the message-recording capacity can be increased while enabling a message to be easily caught in reproduction. Furthermore, the user of the communication apparatus is not required to conduct the setting for each recording of a message, and hence the operation burden on the user can be reduced.

Furthermore, in the communication apparatus of the sixth invention, when information of the caller which arrives through the line at termination of call is received by the reception unit, the control unit determines whether a telephone number coincident with the telephone number contained in the information of the caller is stored in the storage unit or not, and, in the case where the coincident telephone number is judged as being stored, a compression rate of recording which is stored in relation to the telephone number is set as the compression rate of recording of the recording and reproducing unit. According to this configuration, the communication apparatus can record more adequately a message from a calling side apparatus in which the level of noise is high or low.

In the communication apparatus, the compression rate of recording corresponding to the telephone number coincident with the telephone number contained in information of the caller which arrives through the line at termination of call can be set as the compression rate of recording of the recording and reproducing unit. For example, a telephone number of a calling side apparatus of a high noise level is previously registered in the communication apparatus in relation to a low compression rate of recording, or a telephone number of a calling side apparatus of a low noise level is previously registered in relation to a high compression rate of recording. According to this configuration, in the communication apparatus, the message-recording capacity can be further increased while enabling a message from a calling side apparatus to be easily caught in reproduction. Furthermore, the user of the communication apparatus is not required to conduct the setting for each recording of a message, and hence the operation burden on the user can be reduced.

In a seventh invention, a communication apparatus comprises a recording and reproducing unit for recording a message of a caller which arrives through a line, and reproducing the recorded message with arbitrary timing, and the apparatus further comprises:

a storage unit for storing one or more telephone numbers;

a reception unit for at termination of the call, receiving information of the caller which arrives through the line; and a control unit for, when a message is recorded by the recording and reproducing unit, associating the message with a telephone number contained in the information of the caller received by the reception unit, and in the case where the recorded message is to be reproduced by the recording and reproducing unit, determining whether a telephone number coincident with the telephone number corresponding to the reproduced message is stored in the storage unit or not, and, adjusting a reproducing condition of the recording and reproducing unit on the basis of the determination.

According to the seventh invention, the communication apparatus operates as described above. As a result, in the communication apparatus, each time when a message is to be reproduced, a condition of reproducing the message can be automatically adjusted in accordance with the telephone number in the information of the caller which is received before the recording of the message. Therefore, the communication apparatus can adequately reproduce the message from the calling side apparatus in accordance with the calling side communication apparatus.

In an eighth invention, the communication apparatus of the seventh invention is configured so that the storage unit further stores a reproducing condition which is to be used when the information of the caller containing the telephone number is received, in relation to the stored telephone number, and, in the case where the message recorded by the recording and reproducing unit is to be reproduced and a telephone number coincident with the telephone number corresponding to the reproduced message is judged as being stored in the storage unit, the controlling means sets a reproducing condition which is stored in relation to the telephone number, as a reproducing condition of the recording and reproducing unit.

According to the eighth invention, the communication apparatus operates as described above. As a result, when a message is to be reproduced, the reproducing condition is set easily and adequately on the basis of the telephone number corresponding to the message. Therefore, the communication apparatus can reproduce more adequately the message from the calling side apparatus in accordance with the calling side communication apparatus.

In a ninth invention, the communication apparatus of the eighth invention is configured so that the apparatus further comprises an operation unit for setting a reproducing condition for reproduction of the message recorded by the recording and reproducing unit, and, when the reproducing condition is set by the operation unit during reproduction of the message recorded by the recording and reproducing unit, the control unit stores the set reproducing condition into the storage unit in relation to a telephone number corresponding to the reproduced message.

According to the ninth invention, the communication apparatus operates as described above. Therefore, the communication apparatus can set a telephone number and a reproducing condition with requiring no cumbersome operations by the user.

In a tenth invention, the communication apparatus of the seventh invention is configured so that the reproducing condition is a reproducing volume of the message.

According to the tenth invention, when the recording and reproducing unit of the communication apparatus records a message, the recorded message is associated by the control unit with the telephone number contained in the information of the caller received by the reception unit, and in the case where the recorded message is to be reproduced, the control unit determines whether the telephone number coincident with the telephone number corresponding to the reproduced message is stored in the storage unit or not, and adjusts a reproducing volume of the recording and reproducing unit on the basis of the determination. According to this configuration, the communication apparatus can reproduce at an adequate volume a recorded message that was sent from a calling side apparatus in which the volume is low or high.

Specifically, in the communication apparatus, the reproducing volume of the recording and reproducing unit can be adjusted on the basis of whether the telephone number coincident with the telephone number corresponding to the reproduced message is previously registered or not. For example, a telephone number of a calling side apparatus which is used by a user of a low voice is previously registered in the communication apparatus, and the communication apparatus is set so that, when a telephone number corresponding to the reproduced message coincides with the registered telephone number, the reproducing volume is increased. Alternatively, a telephone number of a calling side apparatus which is used by a user of a loud voice is previously registered, and the communication apparatus is set so that, when a telephone number corresponding to the reproduced message coincides with the registered telephone number, the reproducing volume is reduced. According to this configuration, the communication apparatus can reproduce at an adequate level a message sent from a calling side apparatus, irrespective of the level of the voice of the user of the calling side apparatus. Furthermore, the user of the communication apparatus is not required to conduct the setting for each reproduction of a message, and hence the operation burden on the user can be reduced.

Furthermore, when the recording and reproducing unit of the communication apparatus records a message, the recorded message is associated by the control unit with the telephone number contained in the information of the caller received by the reception unit, and in the case where the recorded message is to be reproduced, the control unit determines whether a telephone number coincident with the telephone number corresponding to the reproduced message is stored in the storage unit or not, and in the case where a telephone number coincident with the telephone number corresponding to the reproduced message is judged as being stored in the storage unit, sets a reproducing volume which is stored in relation to the telephone number, as a reproducing volume of the recording and reproducing unit. According to this configuration, the communication apparatus can reproduce at a more adequate volume a recorded message that was sent from a calling side apparatus in which the volume is low or high.

Specifically, in the communication apparatus, the reproducing volume which is stored in relation to the telephone number coincident with the telephone number corresponding to the reproduced message can be set as the reproducing volume of the recording and reproducing unit. For example, a telephone number of a calling side apparatus of the user of a low voice is previously stored in relation to a high reproducing volume, or a telephone number of a calling side apparatus of the user of a loud voice is previously stored in in relation to a low reproducing volume. According to this configuration, the communication apparatus can reproduce at a more adequate level a recorded message that was sent from a calling side apparatus, irrespective of the level of the voice of the user of the calling side apparatus. Furthermore, the user of the communication apparatus is not required to conduct the setting for each reproduction of a message, and hence the operation burden on the user can be reduced.

Furthermore, when a message is recorded by the recording and reproducing unit of the communication apparatus, the recorded message is associated by the control unit with the telephone number contained in the information of the caller received by the reception unit, and in the case where the reproducing volume is set by the operation unit during reproduction of the recorded message, the control unit stores the set reproducing volume into the storage unit in relation to a telephone number corresponding to the reproduced message. According to this configuration, the communication apparatus can set a telephone number and a reproducing volume with requiring no cumbersome operation by the user.

In the communication apparatus, when the reproducing volume is once set to an adequate value during reproduction of a message, the reproducing volume corresponding to the telephone number can be thereafter automatically set to the adequate value. According to this configuration, in the communication apparatus, the reproduction of message can be made close to an optimum state with requiring almost no cumbersome operation by the user.

In an eleventh invention, the communication apparatus of the seventh invention is configured so that the reproducing condition is a reproducing speed of a message.

According to the eleventh invention, when a message is recorded by the recording and reproducing unit of the communication apparatus, the recorded message is associated by the control unit with a telephone number contained in information of the caller received by the reception unit, and in the case where the recorded message is to be reproduced, the control unit determines whether a telephone number coincident with the telephone number corresponding to the reproduced message is stored in the storage unit or not, and adjusts the reproducing speed of the recording and reproducing functions on the basis of the determination. According to this configuration, the communication apparatus can reproduce at an adequate speed the received message that was sent from the calling side apparatus used by the user who speaks rapidly or slowly.

Specifically, in the communication apparatus, the reproducing speed of the recording and reproducing unit can be adjusted on the basis of whether a telephone number coincident with the telephone number corresponding to the reproduced message is previously registered or not. For example, a telephone number of a calling side apparatus which is used by the user who speaks rapidly is previously registered, and the communication apparatus is set so that, when a telephone number corresponding to the reproduced message coincides with the registered telephone number, the reproducing speed is reduced. Alternatively, a telephone number of a calling side apparatus which is used by the user who speaks slowly is previously registered in the communication apparatus, and the communication apparatus is set so that, when a telephone number corresponding to the reproduced message coincides with the registered telephone number, the reproducing volume is increased. According to this configuration, the communication apparatus can reproduce at an adequate level a message sent from a calling side apparatus, irrespective of the speed of the speech of the user of the calling side apparatus. Furthermore, the user of the communication apparatus is not required to conduct the setting for each reproduction of a message, and hence the operation burden on the user can be reduced.

Furthermore, when a message is recorded by the recording and reproducing unit of the communication apparatus, the recorded message is associated by the control unit with the telephone number contained in the information of the caller received by the reception unit, and in the case where the recorded message is to be reproduced, the control unit determines whether a telephone number coincident with the telephone number corresponding to the reproduced message is stored in the storage unit or not, and in the case where the telephone number coincident with the telephone number corresponding to the reproduced message is judged as being stored in the storage unit, sets the reproducing speed which is stored in relation to the telephone number, as a reproducing speed of the recording and reproducing unit. According to this configuration, the communication apparatus can reproduce at a more adequate speed a recorded message that was sent from a calling side apparatus used by the user who speaks rapidly or slowly.

Specifically, in the communication apparatus, the reproducing speed which is stored in relation to a telephone number coincident with the telephone number corresponding to the reproduced message can be set as the reproducing speed of the recording and reproducing unit. For example, a telephone number of a calling side apparatus of the user who speaks rapidly is previously registered in correspondence with a low reproducing speed, or a telephone number of a calling side apparatus of the user who speaks slowly is previously stored in relation to a high reproducing speed. According to this configuration, the communication apparatus can reproduce at a more adequate speed a recorded message that was sent from a calling side apparatus, irrespective of the speed of the speech of the user of the calling side apparatus. Furthermore, the user of the communication apparatus is not required to conduct the setting for each reproduction of a message, and hence the operation burden on the user can be reduced.

Furthermore, a reproducing speed is stored by the storage unit of the communication apparatus in such a manner that when a message is recorded by the recording and reproducing unit, the recorded message is associated by the control unit with the telephone number contained in the information of the caller received by the reception unit, and in the case where the reproducing speed is set by the operation unit during reproduction of the recorded message, stores the set reproducing speed into the storage unit in relation to a telephone number corresponding to the reproduced message. According to this configuration, the communication apparatus can set a telephone number and a reproducing speed with requiring no cumbersome operation by the user.

In the communication apparatus, when the reproducing speed is once set to an adequate value during reproduction of a message, the reproducing speed corresponding to the telephone number can be thereafter automatically set to the adequate value. According to this configuration, in the communication apparatus, the reproduction of message can be made close to an optimum state with requiring almost no cumbersome operation by the user.

In a twelfth invention, a communication apparatus comprises a recording and reproducing unit for recording a message of a caller which arrives through a line, and reproducing the recorded message with arbitrary timing, and the apparatus further comprises:

a storage unit for storing one or more telephone numbers;

a reception unit for, at termination of call, receiving information of a caller which arrives through the line; and a control unit for, at termination of call, determining whether a telephone number coincident with a telephone number contained in the information of the caller received by the reception unit is stored in the storage unit or not, and controlling the recording of the recording and reproducing unit on the basis of the determination.

According to the twelfth invention, in the communication apparatus, when information of the caller which arrives through the line at termination of call is received by the receiving means, the control unit determines whether a telephone number coincident with a telephone number contained in the information of the caller is stored in the storage unit or not, and, on the basis of the determination, controls the recording of the recording and reproducing unit. According to this configuration, the communication apparatus can automatically record the contents of communication with a calling side apparatus of a user whose speech is inaudible because the voice is low or the user speaks rapidly.

Specifically, in the communication apparatus, the recording of the recording and reproducing unit can be conducted on the basis of whether a telephone number coincident with the telephone number contained in the received information of the caller which arrives through the line at termination of call is previously registered or not. For example, the telephone number of a calling side apparatus of a user whose speech is inaudible because the voice is low or the user speaks rapidly is previously registered. The communication apparatus is preset so that, when information of the caller containing the telephone number is received, the recording is automatically started. According to this configuration, the communication apparatus can automatically record the contents of communication with a communication apparatus of a user whose speech is inaudible because the voice is low or the user speaks rapidly. Therefore, the user of the communication apparatus does not fail to catch the contents of conversation and can take an appropriate measure.

BRIEF DESCRIPTION OF THE DRAWINGS

Other and further objects, features, and advantages of the invention will be more explicit from the following detailed description taken with reference to the drawings wherein:

FIGS. 2A to 2C are views showing the data configuration in a storage unit 9 of FIG. 1.

DETAILED DESCRIPTION OF THE PREFERRED EMBODIMENTS

Now referring to the drawings, preferred embodiments of the invention are described below.

Figure 1:
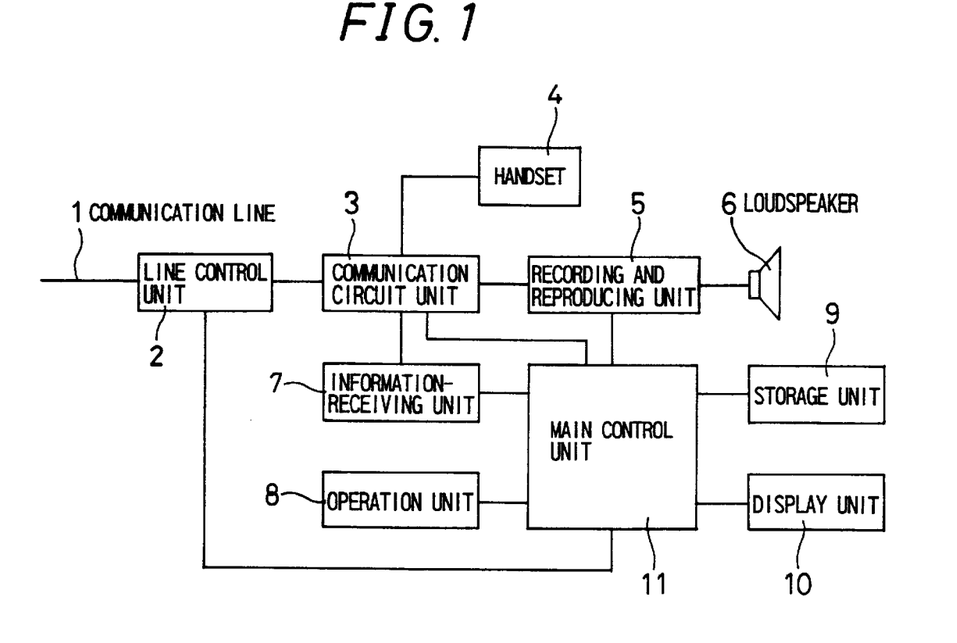
FIG. 1 is a schematic functional block diagram showing the electrical configuration of a communication apparatus of an embodiment of the invention.

FIG. 1 is a schematic functional block diagram showing the electrical configuration of a communication apparatus which is an embodiment of the invention. The communication apparatus of the embodiment comprises a communication line 1, a line control unit 2, a communication circuit unit 3, a handset 4, a recording and reproducing unit 5, a loudspeaker 6, an information-receiving unit 7, an operation unit 8, a storage unit 9, and a display unit 10.

The communication line 1 is connected to a calling side apparatus via an exchange (not shown). The line control unit 2 conducts seizure/release of the communication line 1, detection of an incoming signal, detection of the state of a hook switch, etc. The communication circuit unit 3 forms a communication path between the communication apparatus and the calling side apparatus via the communication line 1 which is seized by the line control unit 2. The handset 4 communicates with the calling side apparatus with using the communication path formed by the communication circuit unit 3. The recording and reproducing unit 5 records a message which is sent from the calling side apparatus with using the communication path formed by the communication circuit unit 3, and reproduces the recorded message. The loudspeaker 6 outputs a message or the like which is reproduced by the recording and reproducing unit 5, as a sound. The information-receiving unit 7 receives information of the caller which arrives through the communication line 1 at termination of call.

The operation unit 8 comprises numeric keys for inputting a telephone number and the like, and function keys for instructing the start of recording or reproducing of a message, and the like. The storage unit 9 stores a telephone number contained in information of the caller received by the information-receiving unit 7, a telephone number inputted through the operation unit 8, and various set contents corresponding such telephone numbers. The display unit 10 displays the telephone number contained in the information of the caller received by the information-receiving unit 7, the telephone number inputted through the operation unit 8, a telephone number read out from the storage unit 9, and other various kinds of information.

A main control unit 11 controls seizure/release of the communication line 1 in the information-receiving unit 7, the recording and reproducing in the recording and reproducing unit 5, the storage into the storage unit 9, the display on the display unit 10, and the like, on the basis of a result of the reception by the information-receiving unit 7, various instruction signals from the operation unit 8, and information stored in the storage unit 9.

Figure 2A:
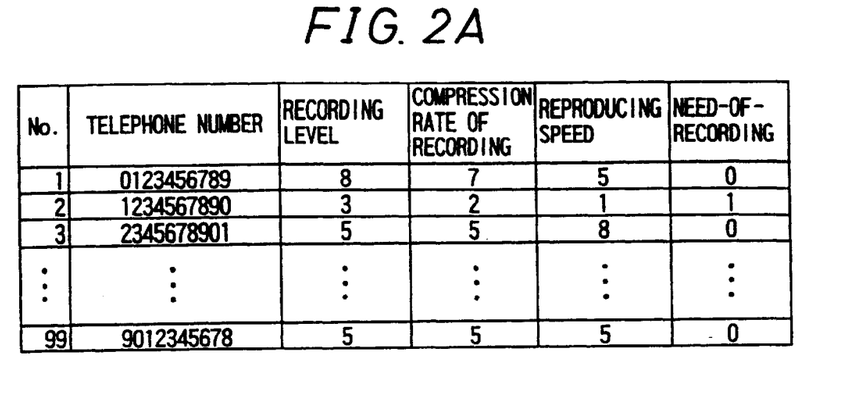
FIG. 2A shows a first example of data configured by a telephone number and various set contents.
Figure 2B:
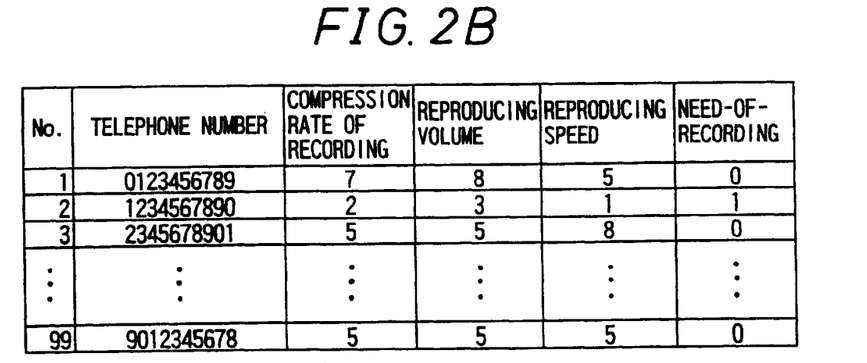
FIG. 2B shows a second example of data configured by a telephone number and various set contents.
Figure 2C:
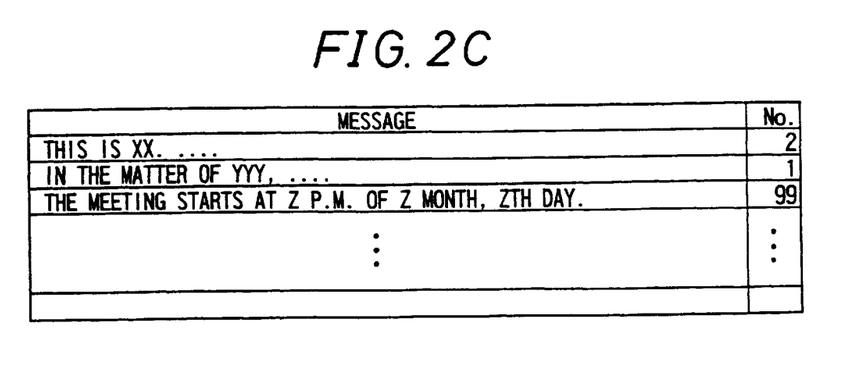
FIG. 2C shows data showing relationships among messages and telephone numbers.

A storage area having a data configuration shown in FIG. 2C is formed in the recording and reproducing unit 5, and a storage area having a data configuration shown in FIG. 2A or 2B is formed in the storage unit 9. The storage area in the storage unit 9 includes a first area for storing one or more telephone numbers, a second area for storing identification numbers of the telephone numbers, and a third area for storing set contents of recording and reproducing conditions respectively corresponding to the telephone numbers. The recording and reproducing conditions relate to recording of a message from a calling side apparatus having information of the caller containing a corresponding telephone number, and also to reproduction of the recorded message. For example, the conditions include at least one of the recording level, the compression rate of recording, the reproducing speed, the reproducing volume, and information indicative of need or no need of recording of a message. The storage area in the recording and reproducing unit 5 includes a first area for storing recorded messages, and a second area for storing identification numbers of the telephone numbers respectively corresponding to the messages in the first area. The recording level, the compression rate of recording, the reproducing speed, and the reproducing volume in the regions shown in FIGS. 2A and 2B and indicative of set conditions are set to one of ten steps from "0" to "9," and information to be recorded or not is indicated in the form of a flag of "1" or "0."

Figure 3:
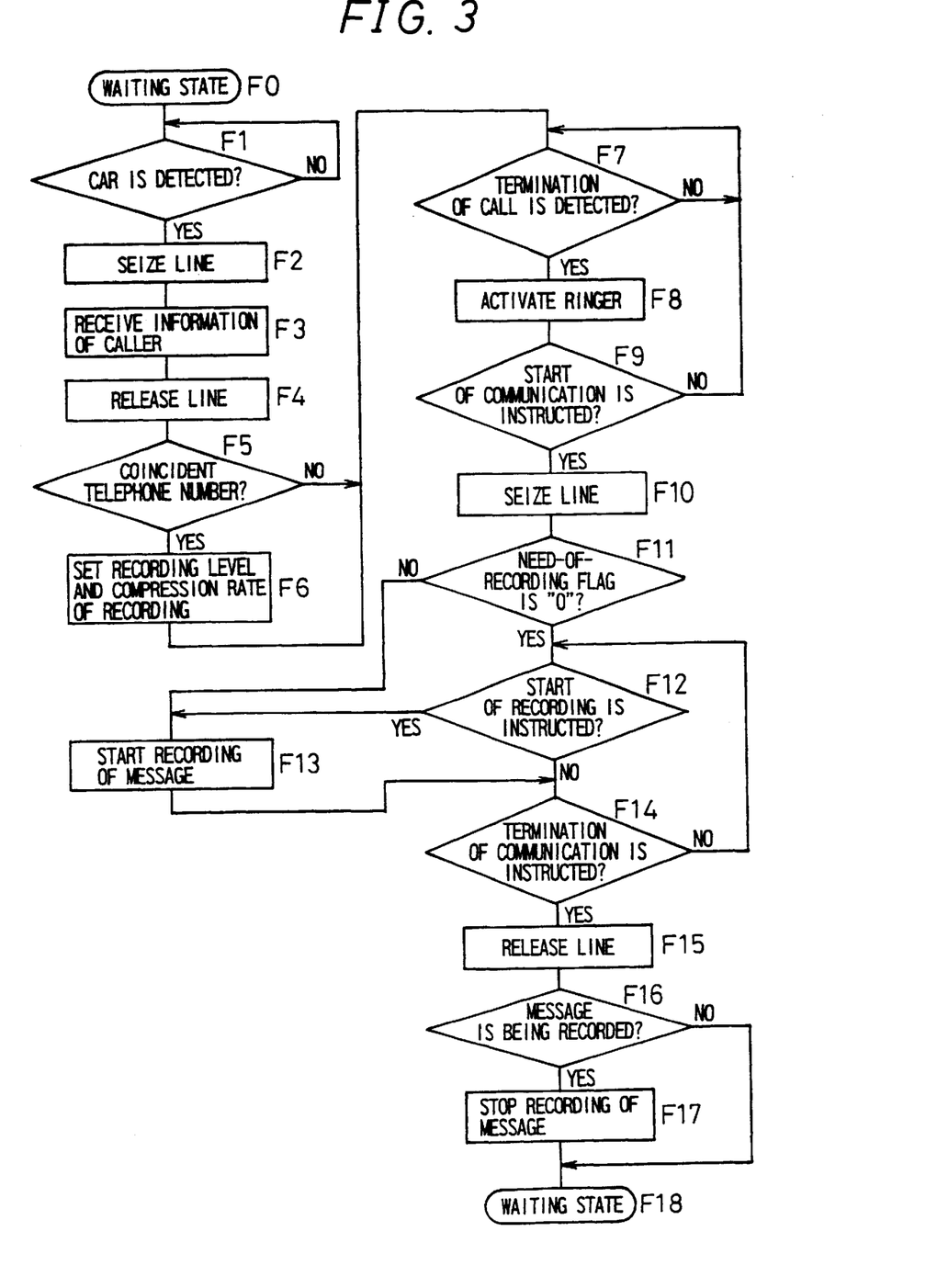
FIG. 3 is a flowchart showing an operation control in the communication apparatus of FIG. 1 at termination of call.

The main control operation at termination of call in the thus configured communication apparatus will be described with reference to the flowchart shown in FIG. 3.

In a waiting state, the control proceeds from step F0 to step F1 to wait for a reception terminal activation signal (CAR) which arrives through the communication line 1 to be detected by the information-receiving unit 7. When CAR is detected, the main control unit 11 controls at step F2 the line control unit 2 so as to seize the communication line 1, and at step F3 the information-receiving unit 7 so as to receive information of the caller which arrives through the seized communication line 1. When reception of information of the caller is then completed, the main control unit 11 controls at step F4 the line control unit 2 so as to release the communication line 1, and determines at step F5 whether a telephone number coincident with the telephone number contained in the information of the caller received by the information-receiving unit 7 is stored in the storage unit 9 or not.

Only in the case where a telephone number coincident with the telephone number contained in the information of the caller received by the information-receiving unit 7 is judged as being stored in the storage unit 9, the main control unit 11 sets at step F6 the recording level and the compression rate of recording of the recording and reproducing unit 5, on the basis of the recording level and the compression rate of recording which are stored in the storage unit 9 in in relation to the telephone number. If a telephone number coincident with the telephone number contained in the information of the caller received by the information-receiving unit 7 is judged as being not stored in the storage unit 9, the main control unit 11 sets the recording level and the compression rate of recording of the recording and reproducing unit 5 to the initial set state (for example, an intermediate level and an intermediate rate).

After the setting of the recording level and the compression rate of recording of the recording and reproducing unit 5 is completed, the main control unit 11 waits at step F7 for a call signal which arrives through the communication line 1 to be detected by the line control unit 2. After the call signal is detected, the main control unit 11 activates at step F8 a ringer which is not shown, to announce the reception.

Then, the main control unit 11 waits at step F9 for a start of communication to be instructed by an operation such as that the user off-hooks the handset 4 or operates the operation unit 8 in response to the announcement of the reception. After instructions of a start of communication, the main control unit 11 controls at step F10 the line control unit 2 so as to seize the communication line 1, thereby causing the whole of the communication apparatus to enter the communication enabled state, and checks at step F11 whether the flag of need of recording, stored in relation to the telephone number coincident with the telephone number contained in the information of the caller received by the information-receiving unit 7 is "1" or "0." If the flag of need of recording is "0," the main control unit 11 waits at step F12 for instructions of a start of recording of a message. After instructions, the main control unit 11 waits at step F14 for instructions of a termination of communication.

When at step F11 the flag of need of recording, stored in relation to the telephone number coincident with the telephone number contained in the information of the caller received by the information-receiving unit 7 is judged as being "1," or when the user operates at step F12 the operation unit 8 to instruct a start of recording of a message, the main control unit 11 controls at step F13 the recording and reproducing unit 5 so as to record a message sent from the calling side apparatus at the recording level and the compression rate of recording which have been already set.

When the user instructs at step F14 a termination of communication under this communication state by on-hooking the handset 4 or operating the operation unit 8, the main control unit 11 controls the line control unit 2 so as to release the communication line 1, and checks at step F16 whether recording of a message is being conducted in the recording and reproducing unit 5 or not. If it is judged that the recording of the message is being conducted, the main control unit 11 controls at step F17 the recording and reproducing unit 5 so as to store the identification number of the telephone number in the storage unit 9 as a telephone number corresponding to the recorded message. Thereafter, the recording of the message is ended, and the control returns to the original waiting state.

Also when the user instructs a termination of the recording of the message under the communication state by operating the operation unit 8, the recording and reproducing unit 5 is similarly controlled so that the telephone number in the storage unit 9 is stored as a telephone number corresponding to the recorded message, and the recording of the message is then ended. If a telephone number corresponding to the recorded message is not stored in the storage unit 9, the telephone number contained in the information of the caller received by the information-receiving unit 7 may be automatically stored into the storage unit with adding an identification number, and the added identification number may be stored.

According to the control operation, therefore, the recording level and the compression rate of recording of a message can be automatically set on the basis of the telephone number contained in the information of the caller which arrives through the communication line 1. Furthermore, also the decision on whether the recording of the message is to be started or not can be automatically conducted, and the recording can be automatically executed.

Specifically, when, in a state where data shown in FIG. 2A are stored in the storage unit 9, the reception terminal activation signal and information of the caller which arrives through the communication line 1 are received by the information-receiving unit 7 and the telephone number contained in the received information of the caller is "1234567890," the main control unit 11 can automatically set the recording level of the recording and reproducing unit 5 to be "3" and the compression rate of recording to be "2" on the basis of data of the recording level and the compression rate of recording corresponding to the telephone number, and start the recording of the message with the timing when communication is started. Even when the contents of conversation is inaudible because the user of the calling side apparatus of the telephone number of "1234567890" speaks loudly and line noises and ambient noises are high in level, therefore, the recording level is made lower and the compression rate of recording is reduced. Although a relatively large memory capacity is required for storing a message, therefore, contents of the conversation can be automatically recorded in an optimum state.

When the reception terminal activation signal and information of the caller which arrives through the communication line 1 are received by the information-receiving unit 7 and the telephone number contained in the received information of the caller is "0123456789," the main control unit 11 can automatically set the recording level of the recording and reproducing unit 5 to be "8" and the compression rate of recording to be "7" on the basis of data of the recording level and the compression rate of recording corresponding to the telephone number. Even when the contents of conversation is inaudible because the user of the calling side apparatus of the telephone number of "0123456789" speaks in a low voice, therefore, the recording level is made higher and the compression rate of recording is increased. Therefore, contents of the conversation can be recorded in an optimum state while a memory of a relatively small capacity is used for storing a message.

When the reception terminal activation signal and information of the caller which arrives through the communication line 1 are received by the information-receiving unit 7 and the telephone number contained in the received information of the caller is "9012345678" which is not a previously registered one, the main control unit 11 can automatically set both the recording level and the compression rate of recording of the recording and reproducing unit 5 to be "5" which is a mean level, and register the telephone number "9012345678" and various set contents for the number into the storage unit 9. Even when the calling side apparatus of the telephone number "9012345678" is not a previously registered once, therefore, contents of conversation with the calling side apparatus can be recorded without hindrance, and cumbersome registration operations which are to be conducted by the user can be reduced.

Figure 4:
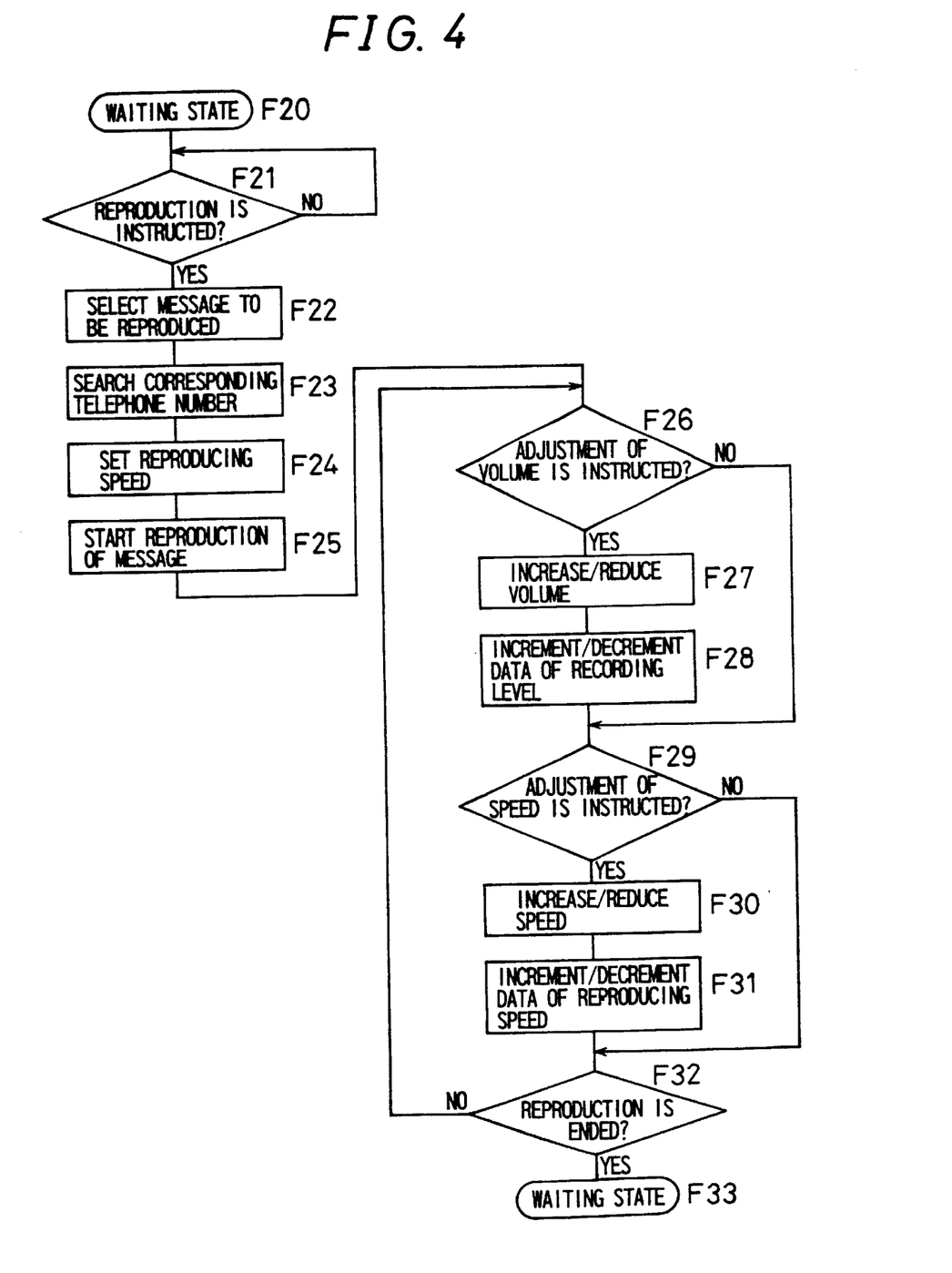
FIG. 4 is a flowchart showing a first operation control in the communication apparatus of FIG. 1 at reproduction of a message.
Figure 5:
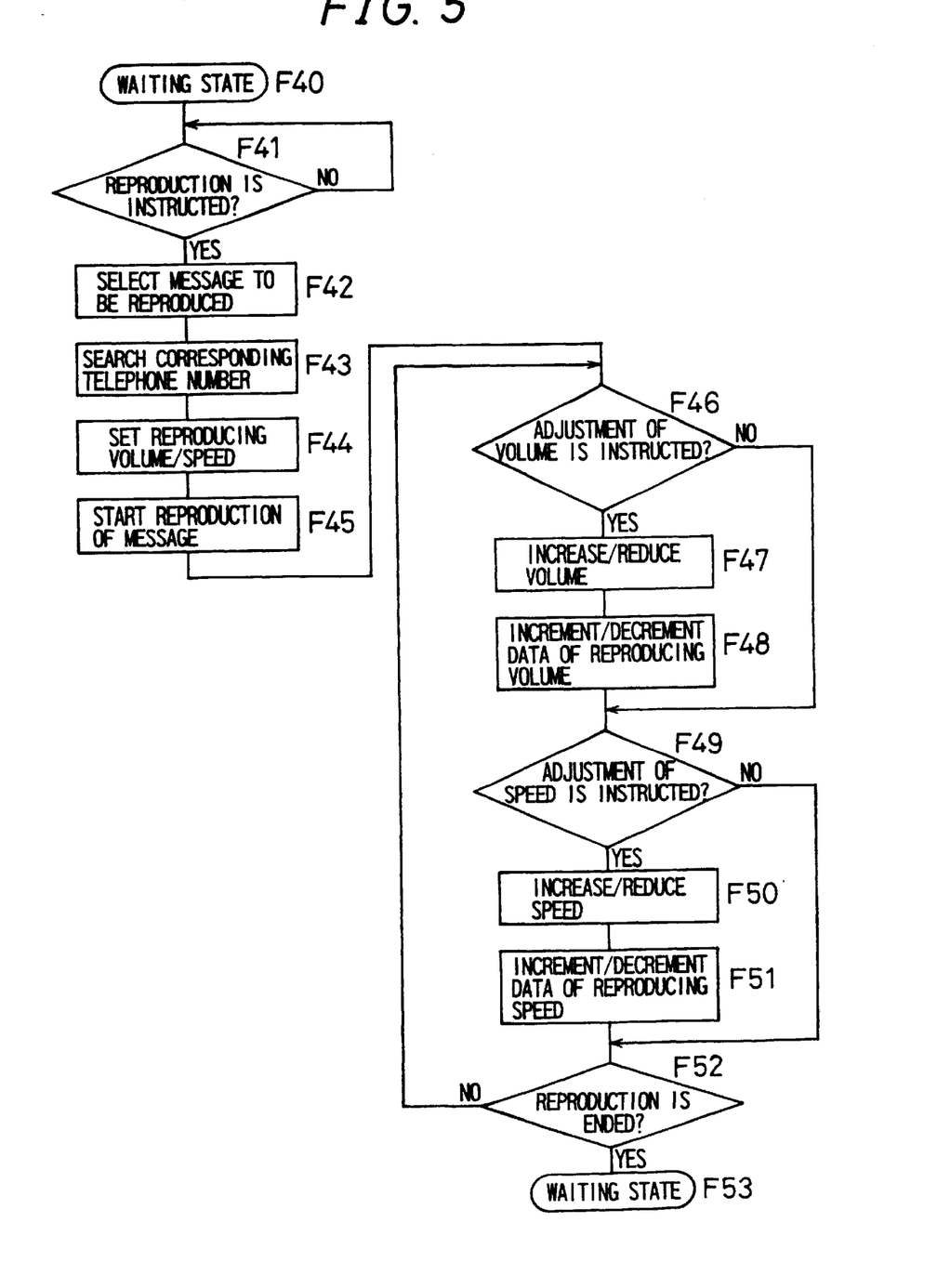
FIG. 5 is a flowchart showing a second operation control in the communication apparatus of FIG. 1 at reproduction of a message.

When a message is to be reproduced, the main control unit 11 conducts one of first and second control operations shown in FIGS. 4 and 5.

Hereinafter, the first control operation in reproduction of a message will be described with reference to the flowchart of FIG. 4.

A message shown in FIG. 2C is recorded in the recording and reproducing unit 5, and data shown in FIG. 2A is stored in the storage unit 9. In this case, the control proceeds from the waiting state of step F20 to step F21 and waits for an input of instructions of reproduction of a message by the user through the operation unit 8. After instructions, the main control unit 11 controls at step F22 the recording and reproducing unit 5 so as to select a message which is to be reproduced, and searches at step F23 the telephone number in the storage unit 9 on the basis of the identification number which is stored in relation to the selected message. According to the reproducing speed which is stored in relation to the searched telephone number, the reproducing speed of the recording and reproducing unit 5 is set at step F24. When the setting of the reproducing speed of the recording and reproducing unit 5 has been completed, the main control unit 11 controls at step F25 the recording and reproducing unit 5 so as to reproduce the selected message. The reproduced message is outputted as a sound from the handset 4 or the loudspeaker 6.

Under this message-reproducing state, the main control unit 11 waits at steps F26 and F29 for instructions for adjustments of the reproducing volume and speed. When the user operates the operation unit 8 to adjust the reproducing volume (step F26), the main control unit 11 controls at step F27 the recording and reproducing unit 5 so as to increase or reduce the reproducing volume of a message, and increments or decrements at step F28 the value of the recording level which is stored in relation to the telephone number corresponding to the reproduced message. Also when the user operates the operation unit 8 to adjust the reproducing speed (step F29), the main control unit 11 controls at step F30 the recording and reproducing unit 5 so as to increase or reduce the reproducing speed of a message, and increments or decrements at step F31 the value of the reproducing speed which is stored in relation to the telephone number corresponding to the reproduced message. When the reproduction of message is ended at step F32, the main control unit 11 terminates the message-reproducing operation and then returns to the waiting state. When there is another message to be next reproduced, the next message may be reproduced in succession to the end of the reproduction.

According to the control operation, therefore, the communication apparatus can automatically set the reproducing speed on the basis of the telephone number corresponding to a message. In the communication apparatus, when the reproducing volume and the reproducing speed of a reproduced message, are once adjusted, when another message corresponding to the telephone number corresponding to the message is then to be reproduced, the calling side message can be automatically reproduced at an optimum reproducing volume and an optimum reproducing speed without requiring such an adjustment.

Specifically, the data shown in FIG. 2A are stored in the storage unit 9 and the data shown in FIG. 2C are recorded in the recording and reproducing unit 5. Under this state, for example, a message "This is Mr. XX . . . " is to be reproduced. In this case, the main control unit 11 can search a telephone number on the basis of the identification number "2" corresponding to the message, and automatically set the reproducing speed of the recording and reproducing unit 5 to be "1," on the basis of data of the reproducing speed corresponding to the identification number "2" of the telephone number. Even when the user of the calling side apparatus sending the message "This is Mr. XX. . . " speaks rapidly, therefore, the message can be reproduced in an optimum state.

Next, the second control operation in reproduction of a message will be described with reference to the flowchart of FIG. 5.

A message shown in FIG. 2C is recorded in the recording and reproducing unit 5, and data shown in FIG. 2A is stored in the storage unit 9. In this case, the control proceeds from the waiting state of step F40 to step F41 and waits for an input of instructions of reproduction of a message by the user through the operation unit 8. After instructions, the main control unit 11 controls at step F42 the recording and reproducing unit 5 so as to select a message which is to be reproduced, and searches at step F43 the telephone number in the storage unit 9 on the basis of the identification number which is stored in relation to the selected message. According to the reproducing volume and speed which are stored in relation to the searched telephone number, the reproducing volume and speed of the recording and reproducing unit 5 are set at step F44. When the setting of the reproducing speed of the recording and reproducing unit 5 has been completed, the main control unit 11 controls at step F45 the recording and reproducing unit 5 so as to reproduce the selected message. The reproduced message is outputted as a sound from the handset 4 or the loudspeaker 6.

Under this message-reproducing state, the main control unit 11 waits at steps F46 and F49 for instructions for adjustments of the reproducing volume and speed. When the user operates the operation unit 8 to adjust the reproducing volume (step F46), the main control unit 11 controls at step F47 the recording and reproducing unit 5 so as to increase or reduce the reproducing volume of a message, and increments or decrements at step F48 the value of the reproducing volume which is stored in relation to the telephone number corresponding to the reproduced message. Also when the user operates the operation unit 8 to adjust the reproducing speed (step F49), the main control unit 11 controls at step F50 the recording and reproducing unit 5 so as to increase or reduce the reproducing speed of a message, and increments or decrements at step F51 the value of the reproducing speed which is stored in relation to the telephone number corresponding to the reproduced message. The control waits at step F52 for the end of the reproduction of message. When the reproduction of message is ended (step F52), the main control unit 11 terminates the message-reproducing operation and then returns to the waiting state. When there is another message to be next reproduced, the next message may be reproduced in succession to the end of the reproduction.

According to the control operation, therefore, the communication apparatus can automatically set the reproducing volume and the reproducing speed on the basis of the telephone number corresponding to a message. In the communication apparatus, in the case where the reproducing volume and the reproducing speed of a reproduced message are once adjusted, when another message corresponding to the telephone number corresponding to the message is to be reproduced, the reproduction of the other message can be automatically reproduced at optimum reproducing volume and speed without requiring such an adjustment.

Specifically, the data shown in FIG. 2B are stored in the storage unit 9 and the data shown in FIG. 2C are recorded in the recording and reproducing unit 5. Under this state, for example, a message "This is Mr. XX . . . " is to be reproduced. In this case, the main control unit 11 can search a telephone number on the basis of the identification number "2" corresponding to the message, and automatically set the reproducing volume to be "3," and the reproducing speed of the recording and reproducing unit 5 to be "1," on the basis of data of the reproducing volume and speed corresponding to the identification number "2" of the telephone number. Even when the user of the calling side apparatus sending the message "This is Mr. XX . . . " speaks in a loud voice and rapidly, therefore, the message can be reproduced in an optimum state.

When a message "In the matter of YYY, . . . " is to be reproduced, the main control unit 11 can search a telephone number on the basis of the identification number "1" corresponding to the message, and automatically set the reproducing volume of the recording and reproducing unit 5 to be "8," and the reproducing speed to be "5," on the basis of data of the reproducing volume and speed corresponding to the identification number "1" of the telephone number. Even when the user of the calling side apparatus sending the message "In the matter of YYY, . . . " speaks in a low voice, therefore, the message can be reproduced in an optimum state. In the embodiment described above, the recording and reproducing conditions are set to one of plural steps or three or more steps in relation to a telephone number, thereby allowing recording and reproducing to be elaborately conducted in an optimum manner according to a calling side apparatus. The invention is not restricted to the embodiment. For example, the recording and reproducing conditions may be set to one of two steps. When the telephone number of calling side apparatus is a stored one, the conditions may be set to one of the two steps, and, when the telephone number is not a stored one, the conditions may be set to the other step. Also in this case, recording and reproducing can be conducted in an optimum manner according to a calling side apparatus.

In the above, the embodiment of the communication apparatus having a voice recording function of starting the starting of a message on the basis of an operation by the user or the flag of need of recording, stored in relation to the telephone number, has been described. The invention is not restricted to the embodiment. It is a matter of course that the invention can be similarly applied to a communication apparatus and a portable information terminal having a automatically answering function of automatically answering at the termination of a call and then starting to record a message by using such a voice recording function.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus provided with a recording and reproducing unit capable of recording a message of a caller which arrives through a line, and as well reproducing the recorded message with arbitrary timing, comprising:

a storage unit for storing one or more telephone numbers and recording conditions for each of the one or more telephone numbers, said recording conditions including at least one of a recording level for recording the message from the caller, a compression rate for recording the message from the caller and information indicative of whether or not to record the message from the caller;

a reception unit for receiving information of the caller which arrives through the line at termination of the call; and a control unit for, upon termination of the call, determining whether a telephone number coincident with a telephone number contained in information of the caller received by the reception unit is stored in the storage unit or not, and automatically adjusting recording conditions of the recording and reproducing unit for optimal recording conditions on the basis of the determination where the adjusted recording conditions being set correspond to the recording conditions stored in the storage unit for the telephone number of the caller.

2. The communication apparatus of claim 1, the apparatus further comprising:

an operation unit for setting a reproducing condition of a message recorded by the recording and reproducing unit, wherein when a message is recorded by the recording and reproducing unit, the message is associated by the control unit with the telephone number contained in the information of the caller received by the reception unit, and in the case where the reproducing condition is set by the operation unit during reproduction of the message recorded by the recording and reproducing unit, the control unit sets recording conditions on the basis of the set reproducing condition and stores the recording conditions into the storage unit in relation to the telephone number corresponding to the reproduced message.

3. The communication apparatus of claim 1, wherein in the case where at termination of the call the telephone number coincident with the telephone number contained in the information of the caller received by the reception unit is judged as being not stored in the storage unit, the control unit stores the received telephone number into the storage unit.

4. The communication apparatus of claim 1, wherein the recording condition is a recording level of a message and a compression rate of recording the message.

5. A communication apparatus comprising:

a recording and reproducing unit for recording a message of a caller which arrives through a line, and reproducing the recorded message with arbitrary timing, and the apparatus further comprising:

a storage unit for storing one or more telephone numbers and reproducing conditions for each of the one or more telephone numbers, said reproducing conditions including at least one of a reproducing level for reproducing the recorded message and a reproducing speed;

a reception unit for at termination of the call, receiving information of the caller which arrives through the line; and a control unit for, when a message is recorded by the recording and reproducing unit, associating the message with a telephone number contained in the information of the caller received by the reception unit, and in the case where the recorded message is to be reproduced by the recording and reproducing unit, determining whether a telephone number coincident with the telephone number corresponding to the reproduced message is stored in the storage unit or not, and, automatically adjusting a reproducing condition of the recording and reproducing unit for optimal reproducing conditions on the basis of the determination where the adjusted reproducing conditions being set correspond to the reproducing conditions stored in the storage unit for the telephone number of the caller.

6. The communication apparatus of claim 5, the apparatus further comprising:

an operation unit for setting a reproducing condition for reproduction of the message recorded by the recording and reproducing unit, wherein when the reproducing condition is set by the operation unit during reproduction of the message recorded by the recording and reproducing unit, the control unit stores the set reproducing condition into the storage unit in relation to a telephone number corresponding to the reproduced message.

7. The communication apparatus of claim 5, wherein the reproducing condition is a reproducing volume of the message and a reproducing speed of the message.

8. A communication apparatus comprising a recording and reproducing unit for recording a message of a caller which arrives through a line, and reproducing the recorded message with arbitrary timing, and the apparatus further comprising:

a storage unit for storing one or more telephone numbers;

a reception unit for, at termination of call, receiving information of a caller which arrives through the line; and a control unit for, at termination of call, determining whether a telephone number coincident with a telephone number contained in the information of the caller received by the reception unit is stored in the storage unit or not, and automatically controlling the recording of the recording and reproducing unit for optimal recording conditions on the basis of the determination, where the recording conditions being optimized includes at least one of a recording level for recording the message from the caller, a compression rate for recording the message from the caller and information indicative of whether or not to record the message from the caller.

* * * * *